US012565090B2

(12) United States Patent
Liang et al.

(10) Patent No.: US 12,565,090 B2
(45) Date of Patent: Mar. 3, 2026

(54) GUIDE RAIL ASSEMBLY AND AUTOMOBILE WITH SAME

(71) Applicants: Henniges China Sealing Systems Co, Ltd, Beijing (CN); Henniges Automotive Sealing System Tieling Co, Ltd, Tieling (CN); Henniges Taicang Sealing System Co, Ltd, Taicang City (CN)

(72) Inventors: Jiangwei Liang, Beijing (CN); Haipo Xi, Beijing (CN); Shiqi Sun, Langfang (CN)

(73) Assignee: Henniges China Sealing Systems Co, Ltd, Beijing (CN)

( * ) Notice: Subject to any disclaimer, the term of this patent is extended or adjusted under 35 U.S.C. 154(b) by 78 days.

(21) Appl. No.: 18/461,859

(22) Filed: Sep. 6, 2023

(65) Prior Publication Data

US 2024/0209682 A1     Jun. 27, 2024

(30) Foreign Application Priority Data

Sep. 6, 2022     (CN) .......................... 202222368130.3

(51) Int. Cl.
B60J 10/76          (2016.01)
B60J 10/00          (2016.01)
(Continued)

(52) U.S. Cl.
CPC .............. B60J 10/76 (2016.02); B60J 10/30 (2016.02); B60J 10/45 (2016.02); B60J 10/78 (2016.02); B60J 10/79 (2016.02)

(58) Field of Classification Search
CPC ... B60J 10/78; B60J 10/79; B60J 10/74; B60J 10/76; B60J 5/0402; B60J 10/30; B60J 10/45
See application file for complete search history.

(56) References Cited

U.S. PATENT DOCUMENTS

| | | | | |
|---|---|---|---|---|
| 4,457,111 | A | | 7/1984 | Koike |
| 5,027,556 | A | * | 7/1991 | Ginster .................... B60J 10/30 |
| | | | | 49/495.1 |

(Continued)

FOREIGN PATENT DOCUMENTS

| | | | |
|---|---|---|---|
| CN | 206812771 U | | 12/2017 |
| CN | 219214694 U | | 6/2023 |

(Continued)

OTHER PUBLICATIONS

English language abstract for CN 219214694 U extracted from espacenet.com database on Dec. 4, 2023, 1 page.

(Continued)

*Primary Examiner* — Justin B Rephann
(74) *Attorney, Agent, or Firm* — Howard & Howard Attorneys PLLC

(57)          ABSTRACT

A guide rail assembly for an automobile includes a guide rail body, a cover plate and a fixing bracket. The guide rail body is provided with a snapping slot and a mounting edge adjacent to the snapping slot. The mounting edge includes a supporting section connected with a fixing section, and a sealing strip snaps into the snapping slot for sealing the gap between the guide rail body and a side edge of triangular glass and sealing the gap between the guide rail body and a lifting glass. The supporting section is suitable for carrying the side edge; one side of the cover plate is fixed on the fixing section and another side of the cover plate at least partially covers the sealing strip. The fixing bracket is disposed on the fixing section for fixing the guide rail body to the door sheet metal of the automobile.

17 Claims, 7 Drawing Sheets

(51) Int. Cl.
 *B60J 10/30* (2016.01)
 *B60J 10/78* (2016.01)
 *B60J 10/79* (2016.01)

(56) References Cited

U.S. PATENT DOCUMENTS

| | | | | |
|---|---|---|---|---|
| 5,317,835 A * | 6/1994 | Dupuy | B60J 10/79 | |
| | | | 49/377 | |
| 5,461,830 A | 10/1995 | Dupuy | | |
| 5,746,471 A * | 5/1998 | Teramoto | B29C 70/72 | |
| | | | 296/146.1 | |
| 6,141,910 A | 11/2000 | Kobrehel et al. | | |
| 7,356,967 B2 | 4/2008 | Zwolinski et al. | | |
| 8,397,433 B2 | 3/2013 | Holmes | | |
| 8,667,739 B2 | 3/2014 | Brookman | | |
| 8,800,207 B2 * | 8/2014 | Kuwabara | B60J 5/0402 | |
| | | | 49/441 | |
| 9,254,733 B2 | 2/2016 | Costigan et al. | | |
| 9,272,612 B2 | 3/2016 | Beach | | |
| 9,475,374 B2 | 10/2016 | Murree et al. | | |
| 9,944,158 B2 | 4/2018 | Beach | | |
| 11,679,650 B2 * | 6/2023 | Kimura | B60J 5/0404 | |
| | | | 49/404 | |
| 2001/0034976 A1 * | 11/2001 | Maass | B60J 10/78 | |
| | | | 49/441 | |
| 2002/0046499 A1 * | 4/2002 | Nozaki | B60J 10/74 | |
| | | | 49/441 | |
| 2006/0156632 A1 * | 7/2006 | Ruppert | B29C 45/14434 | |
| | | | 49/502 | |
| 2007/0089371 A1 * | 4/2007 | Krause | B60J 10/248 | |
| | | | 49/441 | |
| 2007/0262607 A1 * | 11/2007 | Saito | B62D 65/02 | |
| | | | 296/146.2 | |
| 2007/0262608 A1 | 11/2007 | Saito | | |
| 2009/0001755 A1 * | 1/2009 | Fuetterer | B60J 5/0409 | |
| | | | 296/146.16 | |
| 2010/0156138 A1 * | 6/2010 | Terai | B60J 1/007 | |
| | | | 296/146.3 | |
| 2013/0160374 A1 * | 6/2013 | Kuwabara | B60J 10/79 | |
| | | | 49/440 | |
| 2015/0108785 A1 * | 4/2015 | Yokota | B23K 31/02 | |
| | | | 228/101 | |
| 2015/0135600 A1 * | 5/2015 | Yokota | B60J 5/0412 | |
| | | | 49/502 | |
| 2017/0129318 A1 * | 5/2017 | Uemura | B60J 10/79 | |
| 2019/0160716 A1 | 5/2019 | Thomson et al. | | |
| 2019/0381875 A1 * | 12/2019 | Schmitz | B60J 10/76 | |
| 2020/0139799 A1 * | 5/2020 | Blottiau | B60J 10/74 | |
| 2020/0247220 A1 | 8/2020 | Lorentsson et al. | | |
| 2020/0276890 A1 * | 9/2020 | Kimura | B60J 5/0404 | |
| 2021/0170835 A1 * | 6/2021 | Fukui | E05F 15/689 | |
| 2022/0089004 A1 * | 3/2022 | An | B60J 5/0402 | |
| 2022/0219519 A1 | 7/2022 | Groters et al. | | |

FOREIGN PATENT DOCUMENTS

| | | | |
|---|---|---|---|
| DE | 102019125811 A1 | 3/2021 | |
| EP | 2607127 B1 | 11/2018 | |
| WO | 2013167818 A1 | 11/2013 | |
| WO | 2023225193 A1 | 11/2023 | |

OTHER PUBLICATIONS

Machine-Assisted English language abstract for DE 10 2019 125 811 A1 extracted from espacenet.com database on Dec. 4, 2023, 2 pages.
English language abstract for WO 2013/167818 A1 extracted from espacenet.com database on Dec. 4, 2023, 2 pages.
European Search Report for Application EP 23 19 5522 dated Jan. 23, 2024, 2 pages.
English language abstract for CN 206812771 U extracted from espacenet.com database on Feb. 10, 2024, 1 page.

* cited by examiner

A-A

C-C

D-D

GUIDE RAIL ASSEMBLY AND AUTOMOBILE WITH SAME

CROSS-REFERENCE TO RELATED APPLICATIONS

The present application claims priority to and all the benefits of Chinese Patent Application No. 202222368130.3, filed on Sep. 6, 2022, the entire contents of which are hereby expressly incorporated herein by reference.

TECHNICAL FIELD

The subject disclosure relates to the technical field of automotive manufacturing, and in particular to a guide rail assembly and an automobile with the same.

BACKGROUND

The guide rail structure of the A-pillar quarter window glass of the existing automobile includes an internal guide rail, a guide groove, an external guide rail, and the like. The exterior rail vertically snaps into the interior guide rail, the outer guide rail is an inverted T-shaped female sheet structure, the top end of the outer rail vertical structure snaps within the bottom end of the inner rail vertical structure, and the arc protrusion structure on one side of the outer guide rail is snap-fitted with the bottom of the guide groove. During the assembly process, since the guide rail structure of the quarter window is composed of many parts, its installation is relatively cumbersome, and its manufacturing cost is relatively high.

SUMMARY

The main purpose of the subject disclosure is to provide a guide rail assembly and an automobile with same, aiming to improve the convenience of assembling the guide rail assembly and reduce the manufacturing cost.

In order to achieve the above purpose, the subject disclosure proposes a guide rail assembly for use with a triangular glass and a lifting glass and door sheet metal of an automobile, comprising: a guide rail body having a snapping slot and a mounting edge adjacent to the snapping slot, wherein the mounting edge includes a supporting section and a fixing section connected with the supporting section; a sealing strip snaps into the snapping slot for sealing the gap between the guide rail body and the side edge of the triangular glass and sealing the gap between the guide rail body and the lifting glass; wherein, the supporting section is suitable for carrying the side edge of the triangular glass; a cover plate, one side of the cover plate is fixed on the fixing section, and the other side of the cover plate at least partially covers the sealing strip; and a fixing bracket disposed on the fixing section to fix the guide rail body onto the door sheet metal.

In order to achieve the above object, the subject disclosure also proposes an automobile including the guide rail assembly as described above, and the automobile includes a triangular glass, a lifting glass, a door sheet metal, and a guide rail assembly. The guide rail assembly comprises: a guide rail body provided with a snapping slot and a mounting edge adjacent to the snapping slot, wherein the mounting edge includes a supporting section and a fixing section connected with the supporting section. The guide rail assembly also comprises a sealing strip snapped into the snapping slot for sealing the gap between the guide rail body and the side edge of the triangular glass and sealing the gap between the guide rail body and the lifting glass, wherein, the supporting section is suitable for carrying the side edge of the triangular glass. The guide rail assembly further comprises: a cover plate, one side of the cover plate is fixed on the fixing section, and the other side of the cover plate at least partially covers the sealing strip; and a fixing bracket disposed on the fixing section to fix the guide rail body onto the door sheet metal.

It can be understood that the guide rail body can be integrally pre-formed with the snapping slot and the mounting edge. During production and assembly, the scaling strip can be firstly snapped or bonded in the snapping slot, then the fixing bracket is installed, and then the fixing section at the lower end of the guide rail body can be covered with a cover plate. The subject disclosure reduces the number of parts of the guide rail assembly, simplifies the installation process, improves the convenience of assembly of the guide rail assembly, and reduces the manufacturing cos. At the same time, the sealing between the guide rail assembly and the triangular glass, and between the guide rail assembly and the lifting glass is also improved.

BRIEF DESCRIPTION OF THE DRAWINGS

In order to illustrate the technical solutions in the embodiments of the subject disclosure or the prior art more clearly, the following will briefly introduce the accompanying drawings that need to be used in the description of the embodiments or the prior art. Obviously, the accompanying drawings in the following description are only some embodiments of the subject disclosure, and it is also possible for those skilled in the art to obtain other drawings according to the structures shown in these drawings without creative work.

ILLUSTRATION OF REFERENCE NUMBERS

Figure 1:
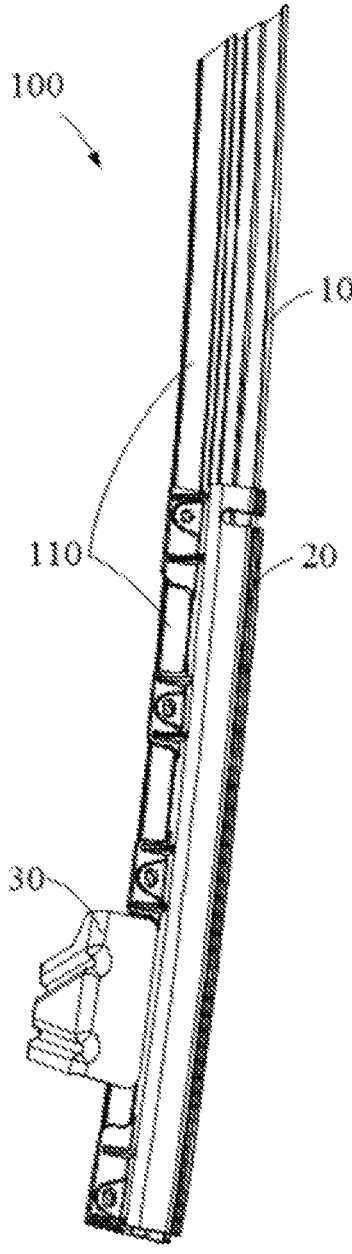
FIG. 1 is a structural schematic diagram of an embodiment of the guide rail assembly of the subject disclosure.

10. guide rail body; 20. cover plate; 30. fixing bracket; 40. sealing strip; 10*a*. snapping slot; 110. mounting edge; 11. supporting section; 12. fixing section; 10*a*1. first embedding cavity; 10*a*2. second embedding cavity; 21. stopper; 20*a*. limiting notch; 41. bump; 100. guide rail assembly; 200. triangular glass.

The realization of the purpose, functional characteristics and advantages of the subject disclosure will be further illustrated in conjunction with the embodiments and with reference to the accompanying drawings.

DETAILED DESCRIPTION

The technical solutions in the embodiments of the subject disclosure will be clearly and completely described below in conjunction with the accompanying drawings in the embodiments of the subject disclosure. Obviously, the described embodiments are only a portion of the embodiments of the subject disclosure, not all of them. Based on the embodiments in the subject disclosure, all other embodiments obtained by persons of ordinary skill in the art without making creative efforts belong to the scope protected by the subject disclosure.

It should be noted that if there is a directional indication (such as up, down, left, right, front, back . . . ) involved in the embodiment of the subject disclosure, the directional indication is only used to explain the relative positional relationship, motion conditions, etc. between the components in a certain posture (as shown in the accompanying drawing). If the specific posture changes, the directional indication will also change therewith accordingly.

In addition, if there are descriptions involving "first", "second", etc. in the embodiments of the subject disclosure, the descriptions of "first", "second", etc. are for descriptive purposes only, and cannot be understood indicate or suggest their relative importance or implying the number of technical features indicated. Thus, the features defined with "first" and "second" may explicitly or implicitly include at least one of these features. In addition, if "and/or" appearing in the whole text means including three parallel schemes, then taking "A and/or B" as an example, it includes scheme A, or scheme B, or a scheme that both A and B are satisfied simultaneously. In addition, the technical solutions of the various embodiments can be combined with each other, but must take that those skilled in the art can realize as a basis. When the combination of technical solutions is contradictory or cannot be realized, such a combination of technical solutions should be considered to be absent, and to be not within the protection scope claimed by the subject disclosure, either.

The subject disclosure proposes a guide rail assembly, which is suitable for installing the triangular glass of the A-pillar of the automobile, but not limited to this.

Referring to FIGS. 1 to 5, in an embodiment of the subject disclosure, the guide rail assembly 100 includes a guide rail body 10, a cover plate 20 and a fixing bracket 30. The guide rail body 10 is provided with a snapping slot 10a and a mounting edge 110 adjacent to the snapping slot 10a along its length direction, and the mounting edge 110 includes a supporting section 11 and a fixing section 12 connected with the supporting section 11. A sealing strip 40 is snapped into the snapping slot 10a for sealing a gap between the guide rail body 10 and the side edge of the triangular glass 200 and sealing a gap between the guide rail body 10 and the lifting glass. The supporting section 11 is suitable for carrying the side edge of the triangular glass 200. One side of the cover plate 20 is fixed on the fixing section 12, and another side of the cover plate 20 at least partially covers the sealing strip 40. The fixing bracket 30 is disposed on the fixing section 12 for fixing the guide rail body 10 on the door sheet metal.

In this embodiment, the guide rail body 10 can be integrally formed with structures such as the snapping slot 10a, the supporting section 11 of the mounting edge 110, and the fixing section 12, etc., and the guide rail body 10 can be made of metal material, especially aluminum, but not limited to this.

The surface of the guide rail body 10 can be sprayed with paint, such as high-gloss black paint, to improve aesthetics and oxidation corrosion resistance.

Figure 2:
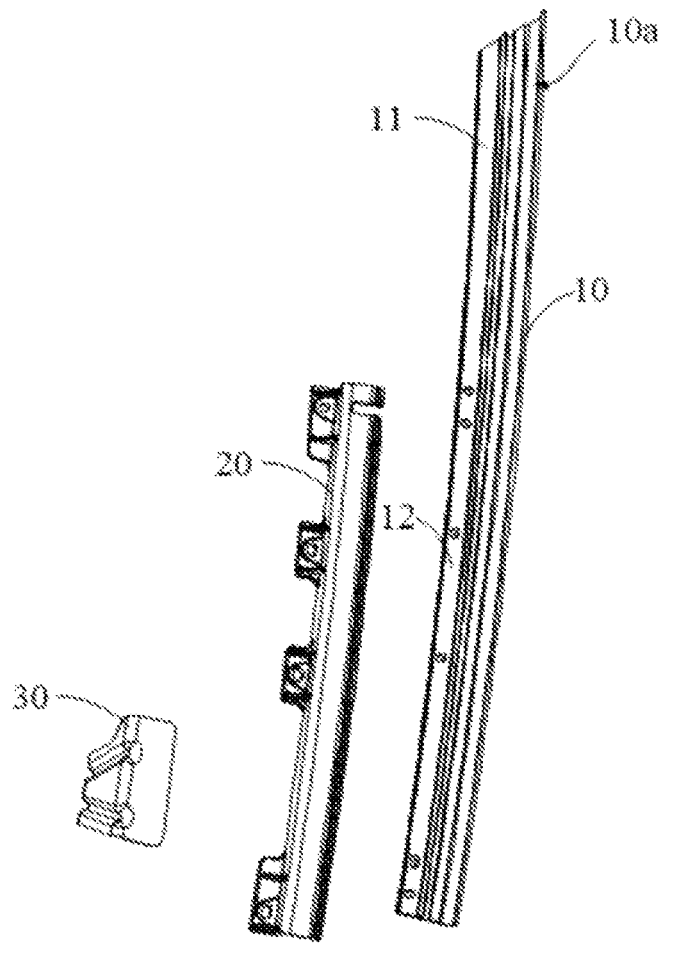
FIG. 2 is an exploded view of an embodiment of the guide rail assembly of the subject disclosure.
Figure 4:
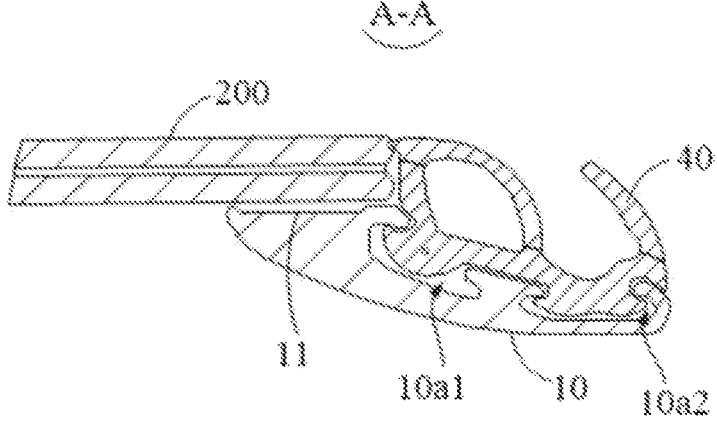
FIG. 4 is a cross-sectional view at A-A in FIG. 3.
Figure 5:
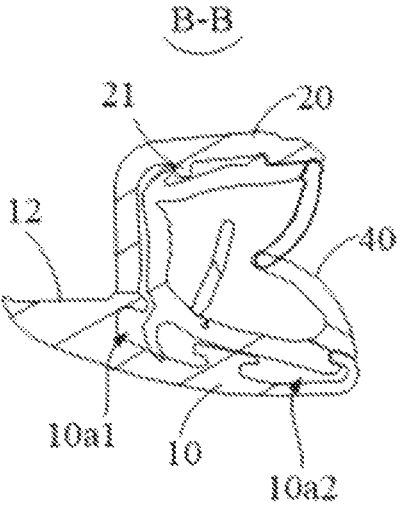
FIG. 5 is a cross-sectional view at B-B in FIG. 3.
Figure 6:
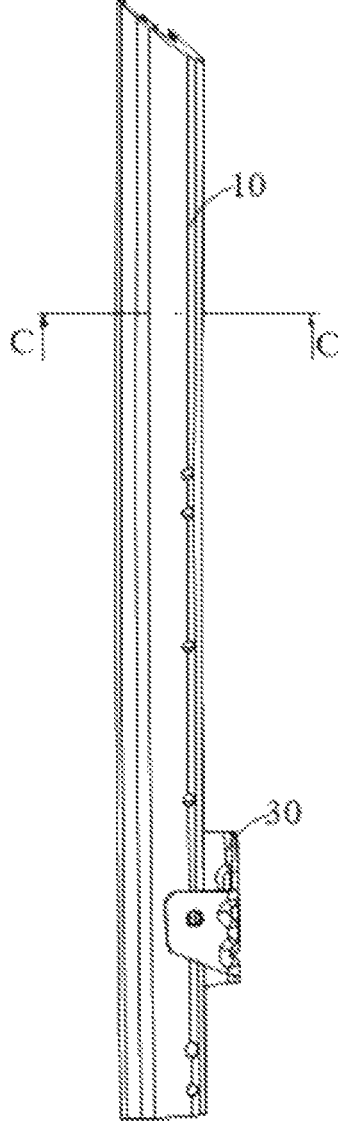
FIG. 6 is a back view of the guide rail assembly in an embodiment of a guide rail assembly of the subject disclosure.
Figure 7:
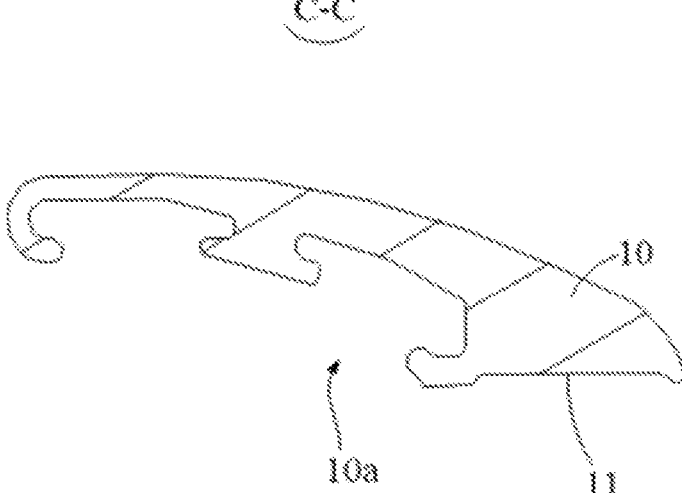
FIG. 7 is a cross-sectional view at C-C in FIG. 6.

Referring to FIG. 2, FIG. 4 and FIG. 5, in this embodiment, the guide rail body 10 can be provided with the mounting edge 110 along its length direction, its supporting section 11 may be arranged flush with the fixing section 12, and a portion of the cover plate 20 fixed to the fixing section 12 can also be arranged flush with the triangular glass 200 so as to ensure zero steps at the joint and improve the overall aesthetics.

In this embodiment, the cover plate 20 and the guide rail body 10 can be connected and fixed by the way of screws or snap-fit, etc. The cover plate 20 can be made of plastic material, especially PA66, but not limited to this.

The fixing bracket 30 can be a metal piece, and the fixing bracket 30 and the guide rail body 10 can be fixed by the way of riveting, welding or threading, etc. The fixing bracket 30 may be an integrally formed component, or may be an assembly assembled from a plurality of components, but not limited to this.

It can be understood that the guide rail body 10 can be integrally pre-formed with structures such as the snapping slot 10a and the mounting edge 110. During production and assembly, the sealing strip 40 is firstly snapped or bonded in the snapping slot 10a, then the fixing bracket 30 is installed, and then the fixing section 12 at the lower end of the guide rail body 10 can be covered with a cover plate 20. The subject disclosure reduces the number of parts of the guide rail assembly 100, simplifies the installation process, improves the convenience of assembly of the guide rail assembly 100, and reduces the manufacturing cost. At the same time, the sealing between the guide rail assembly and the triangular glass, and between the guide rail assembly and the lifting glass is also improved.

In order to improve the reliability of the connection between the guide rail body 10 and the sealing strip 40, and to avoid the sealing performance being affected by the sealing strip 40 disengaging from the installed position, referring to FIG. 4 and FIG. 5, in an embodiment, the slot bottom of the snapping slot 10a can be concavely provided with a first embedding cavity 10a1 and a second embedding cavity 10a2, the slot bottom of the snapping slot 10a is concavely provided with a first embedding cavity 10a1 and a second embedding cavity 10a2, and the sealing strip 40 is convexly provided with a first protrusion embedded into the first insertion cavity 10a1 and a second portion embedded into the second insertion cavity 10a2.

In this embodiment, the sealing strip 40 may include a first sealing strip and a second sealing strip connected with the first sealing strip. The first sealing strip 40 disposed corresponding to the supporting section 11 is used to seal a gap between the side edge of the triangular glass 200 and the guide rail body 10, and the second sealing strip 40 disposed corresponding to the fixing section 12 is used to seal a gap between the guide rail body 10 and the lift glass.

The first sealing strip and the second sealing strip can be extruded separately, and then connected together by injection molding. The material of the first sealing strip and the second sealing strip can be EPDM, but not limited to this.

Figure 8:
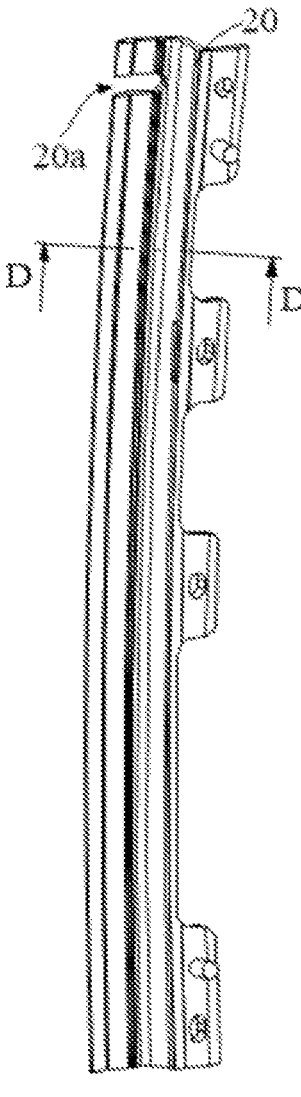
FIG. 8 is a structural schematic diagram of a cover plate in an embodiment of a guide rail assembly of the subject disclosure.
Figure 9:
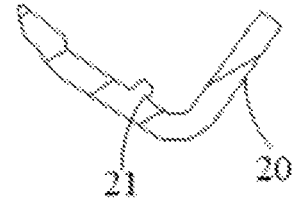
FIG. 9 is a cross-sectional view at D-D in FIG. 8.

Referring to FIG. 8 and FIG. 9, in an embodiment, the cross section of the cover plate 20 may be disposed in a "V" shape to cover the sealing strip 40 at the lower end of the guide rail body 10. The cover plate 20 of this structure is easy to be machined and easy to assemble, further improving the sealing and aesthetics.

In conjunction with FIG. 5 and FIG. 9, in this embodiment, the inner side of the cover plate 20 can be convexly provided with a stopper 21, and a raised bar in abutment with the stopper 21 is disposed at the position of the top portion of the sealing strip 40 corresponding to the stopper 21 can be provided with to limit the movement of the sealing strip 40 along the width direction of the cover plate 20. As such, the stability of the sealing strip 40 is improved, and the movement of the sealing strip 40 is avoided from affecting the sealing performance.

Figure 3:
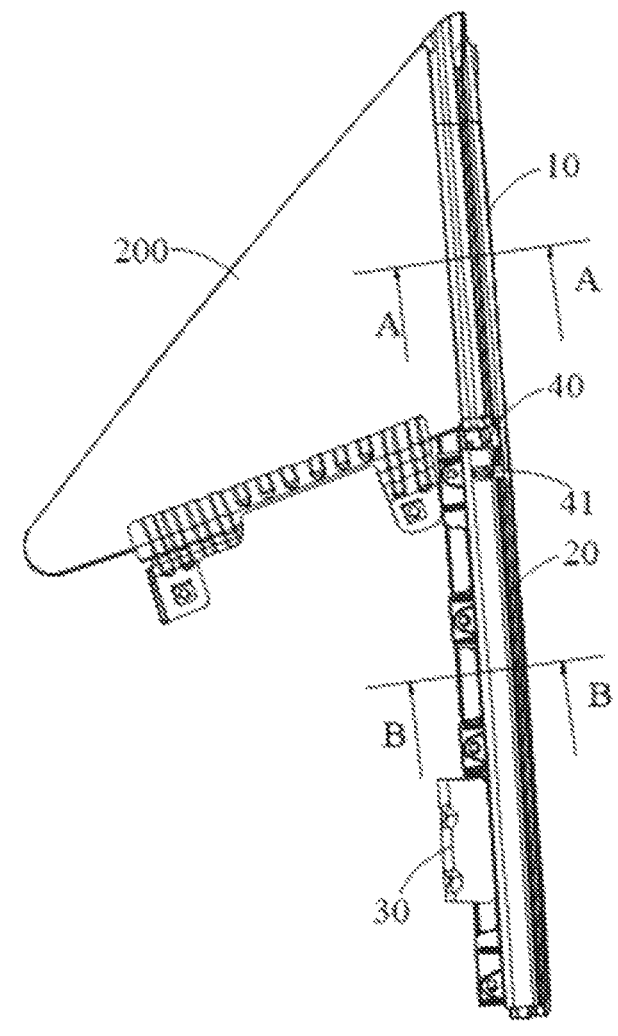
FIG. 3 is a structural schematic diagram of an embodiment of the guide rail assembly and the triangular glass of the subject disclosure.

In order to further avoid sealing failure of the sealing strip 40 to improve the stability of the guide rail assembly 100, referring to FIG. 2, referring to FIG. 3 and FIG. 8, in an embodiment, the cover plate 20 is provided with a limiting notch 20*a*, a bump 41 which snap-fits with the limiting notch 20*a* is disposed at the position of the sealing strip 40 corresponding to the limiting notch 20*a*, and the bump 41 is snapped into the limiting notch 20*a* to limit the movement of the sealing strip 40 along the length direction of the guide rail body 10.

The subject disclosure also proposes an automobile, which includes a guide rail assembly 100, the specific structure of which refers to the above-mentioned embodiments. Since the automobile proposed by the subject disclosure includes all the solutions of all the embodiments of the above-mentioned guide rail assembly 100, it has at least the same technical effect as that of the guide rail assembly 100, which will not be elaborated here one by one.

What is described above is only an optional embodiment of the subject disclosure, and does not therefore limit the patent scope of the subject disclosure. Under the inventive concept of the subject disclosure, the equivalent structural transformation made by using the specification and the contents of the accompanying drawings of the subject disclosure, or their direct/indirect applications in other related technical fields are all included in the patent protection scope of the subject disclosure.

The invention claimed is:

1. A guide rail assembly for use with a triangular glass, a lifting glass, and a door sheet metal of an automobile, said guide rail assembly comprising:
   a guide rail body integrally pre-formed with a snapping slot and a mounting edge adjacent to the snapping slot along a length direction, wherein the mounting edge includes a supporting section suitable for carrying a side edge of the triangular glass and a fixing section at a lower end of the guide rail body connected with the supporting section wherein the supporting and fixing sections are separate and distinct sections of the mounting edge, and the mounting edge is continuous along the length direction from the supporting section to the fixing section;
   a sealing strip snapped into the snapping slot for sealing a gap between the guide rail body and the side edge of the triangular glass and sealing a gap between the guide rail body and the lifting glass;
   a cover plate separately formed from and connected to the guide rail body, wherein one side of the cover plate includes tabs to mount the cover plate to the fixing section of the guide rail body below the supporting section and wherein another side of the cover plate at least partially covers the sealing strip; and
   a fixing bracket separately formed from the cover plate and disposed on the fixing section of the guide rail body below the supporting section adjacent the tabs of the cover plate for fixing the guide rail body onto the door sheet metal.

2. The guide rail assembly according to claim 1, wherein the snapping slot is concavely provided with a first embedding cavity and a second embedding cavity, and the sealing strip is convexly provided with a first protrusion embedded in the first embedding cavity and a second protrusion embedded in the second embedding cavity.

3. The guide rail assembly according to claim 2, wherein the sealing strip comprises a first sealing strip and a second sealing strip connected with the first sealing strip, wherein the first sealing strip is coupled to the supporting section to seal the gap between the side edge of the triangular glass and the guide rail body, and wherein the second sealing strip is coupled to the fixing section to seal the gap between the guide rail body and the lifting glass.

4. The guide rail assembly according to claim 1, wherein a cross-section of the cover plate is disposed in a "V" shape.

5. The guide rail assembly according to claim 4, wherein the cover plate is convexly provided with a stopper used to limit a movement of the sealing strip along the width direction of the cover plate.

6. The guide rail assembly according to claim 5, wherein a raised bar in abutment with a stopper is disposed on a top portion of the sealing strip.

7. The guide rail assembly according to claim 1, wherein a material of the cover plate is plastic,
   wherein the cover plate is provided with a limiting notch, and
   wherein a bump of the sealing strip snap-fits with the limiting notch and limits the movement of the sealing strip along the length direction of the guide rail body.

8. The guide rail assembly according to claim 1, wherein the material of the guide rail body is aluminum and wherein a surface of the guide rail body is sprayed with paint.

9. The guide rail assembly according to claim 1, wherein the fixing bracket and the guide rail body are fixed by riveting or welding.

10. The guide rail assembly according to claim 1, wherein the cover plate and the guide rail body are connected and fixed by screws.

11. An automobile comprising:
    a triangular glass;
    a lifting glass;
    a door sheet metal; and
    a guide rail assembly, said guide rail assembly comprising:
       a guide rail body integrally pre-formed with a snapping slot and a mounting edge adjacent to the snapping slot along a length direction, wherein the mounting edge includes a supporting section suitable for carrying a side edge of the triangular glass and a fixing section at the lower end of the guide rail body connected with the supporting section wherein the supporting and fixing sections are separate and distinct sections of the mounting edge, and the mounting edge is continuous along the length direction from the supporting section to the fixing section,
       a sealing strip snapped into the snapping slot for sealing a gap between the guide rail body and the side edge of the triangular glass and sealing a gap between the guide rail body and the lifting glass,
       a cover plate separately formed from and connected to the guide rail body, wherein one side of the cover plate includes tabs to mount the cover plate to the fixing section of the guide rail body below the supporting section and wherein another side of the cover plate at least partially covers the sealing strip, and
       a fixing bracket separately formed from the cover plate and disposed on the fixing section of the guide rail body below the supporting section adjacent the tabs of the cover plate to fix the guide rail body onto the door sheet metal.

12. The automobile according to claim 11, wherein the snapping slot is concavely provided with a first embedding cavity and a second embedding cavity, and the sealing strip is convexly provided with a first protrusion embedded in the first embedding cavity and a second protrusion embedded in the second embedding cavity.

13. The automobile according to claim 12, wherein the sealing strip comprises a first sealing strip and a second sealing strip connected with the first sealing strip, wherein the first sealing strip is coupled to the supporting section to seal the gap between the side edge of the triangular glass and the guide rail body, and wherein the second sealing strip is coupled to the fixing section to seal the gap between the guide rail body and the lifting glass.

14. The automobile according to claim 11, wherein a cross-section of the cover plate is disposed in a "V" shape.

15. The automobile according to claim 14, wherein the cover plate is convexly provided with a stopper, and wherein the stopper is used to limit the movement of the sealing strip along a width direction of the cover plate.

16. The automobile according to claim 11, wherein a material of the cover plate is plastic, wherein the cover plate is provided with a limiting notch, and wherein a bump of the sealing strip snap-fits with the limiting notch and limits the movement of the sealing strip along the length direction of the guide rail body.

17. The automobile according to claim 16, wherein a raised bar in abutment with a stopper is disposed on a top portion of the sealing strip.

* * * * *